(12) United States Patent
Martinez et al.

(10) Patent No.: US 7,605,959 B2
(45) Date of Patent: Oct. 20, 2009

(54) SYSTEM AND METHOD OF COLOR IMAGE TRANSFORMATION

(75) Inventors: Henry G. Martinez, Dallas, TX (US); Charles G. Martinez, Dallas, TX (US)

(73) Assignee: The Ackley Martinez Company, Dallas, TX (US)

( * ) Notice: Subject to any disclaimer, the term of this patent is extended or adjusted under 35 U.S.C. 154(b) by 532 days.

(21) Appl. No.: 11/146,804

(22) Filed: Jun. 7, 2005

(65) Prior Publication Data

US 2006/0146350 A1    Jul. 6, 2006

Related U.S. Application Data

(60) Provisional application No. 60/641,626, filed on Jan. 5, 2005.

(51) Int. Cl.
  *G03F 3/08* (2006.01)
(52) U.S. Cl. .................. 358/518; 358/1.9; 382/162; 382/167
(58) Field of Classification Search ............ 358/1.9, 358/518; 382/167, 162
  See application file for complete search history.

(56) References Cited

U.S. PATENT DOCUMENTS

| | | |
|---|---|---|
| 3,926,117 A | 12/1975 | Milligan |
| 3,951,668 A | 4/1976 | Schumacher et al. |
| 4,656,941 A | 4/1987 | Brovman |
| 4,665,496 A | 5/1987 | Ott |
| 4,706,206 A | 11/1987 | Benoit et al. |
| 4,717,954 A | 1/1988 | Fujita et al. |
| 4,852,485 A | 8/1989 | Brunner |
| 4,878,977 A | 11/1989 | Kueppers |
| 4,881,181 A | 11/1989 | Jeschke et al. |
| 4,918,622 A | 4/1990 | Granger et al. |

(Continued)

FOREIGN PATENT DOCUMENTS

EP    1538826 A2  *  6/2005

(Continued)

OTHER PUBLICATIONS

G. Marcu, S. Abe, Color Separation for Printing with Non-Standard Inks, Nov. 13-16, 1994, IEEE International Conference, Image Processing, vol. 3, pp. 1002-1005.*

(Continued)

*Primary Examiner*—Mark K Zimmerman
*Assistant Examiner*—Miya J Cato
(74) *Attorney, Agent, or Firm*—Haynes and Boone, LLP

(57) ABSTRACT

A method comprises receiving a set of color transfer curves, receiving a digital image file having a plurality of pixel stacks, for each pixel stack in the digital image file: identify initial percent dot values for the pixel stack, determining a degree of affiliation of the pixel stack to each of seven color families including neutral, cyan, magenta, yellow, red, green, and blue, determining a curve adjustment value for each color transfer curve for each initial percent dot value, applying the curve adjustment values of the color transfer curves to the initial percent dot value and generating a color-correct percent dot value, and replacing the initial percent dot value with the color-corrected percent dot value. The above steps are repeated until all pixel stacks in the digital image file are processed.

56 Claims, 4 Drawing Sheets

U.S. PATENT DOCUMENTS

| | | | |
|---|---|---|---|
| 4,924,323 | A | 5/1990 | Numakura et al. |
| 4,926,254 | A | 5/1990 | Nakatsuka et al. |
| 4,944,746 | A | 7/1990 | Iwata et al. |
| 4,947,746 | A | 8/1990 | Jeschke et al. |
| 4,959,659 | A | 9/1990 | Sasaki et al. |
| 4,975,862 | A | 12/1990 | Keller et al. |
| 5,068,810 | A | 11/1991 | Ott |
| 5,122,977 | A | 6/1992 | Pfeiffer |
| 5,163,012 | A | 11/1992 | Wuhrl et al. |
| 5,212,741 | A | 5/1993 | Curry et al. |
| 5,224,421 | A | 7/1993 | Doherty |
| 5,268,754 | A | 12/1993 | Van de Capelle |
| 5,293,539 | A | 3/1994 | Spence |
| 5,315,380 | A | 5/1994 | Ingraham et al. |
| 5,317,425 | A | 5/1994 | Spence et al. |
| 5,333,069 | A | 7/1994 | Spence |
| 5,343,234 | A | 8/1994 | Kuehnle |
| 5,398,121 | A | 3/1995 | Kowalewski |
| 5,432,892 | A | 7/1995 | Hafner et al. |
| 5,491,558 | A | 2/1996 | Hamilton et al. |
| 5,493,321 | A | 2/1996 | Zwadlo |
| 5,528,377 | A | 6/1996 | Hutcheson |
| 5,544,284 | A | 8/1996 | Allebach et al. |
| 5,572,340 | A | 11/1996 | Eckhardt et al. |
| 5,578,824 | A | 11/1996 | Koguchi et al. |
| 5,579,031 | A | 11/1996 | Liang |
| 5,579,044 | A | 11/1996 | Warner et al. |
| 5,596,510 | A | 1/1997 | Boenke |
| 5,598,272 | A | 1/1997 | Fisch et al. |
| 5,615,282 | A | 3/1997 | Spiegel et al. |
| 5,636,330 | A | 6/1997 | Barak |
| 5,650,942 | A | 7/1997 | Granger |
| 5,676,887 | A | 10/1997 | Soeda et al. |
| 5,677,967 | A | 10/1997 | Pariser |
| 5,687,300 | A * | 11/1997 | Cooper ..................... 358/1.9 |
| 5,689,349 | A | 11/1997 | Plettinck |
| 5,721,811 | A | 2/1998 | Eckhardt et al. |
| 5,734,800 | A | 3/1998 | Herbert et al. |
| 5,745,120 | A | 4/1998 | De Baer et al. |
| 5,754,448 | A | 5/1998 | Edge et al. |
| 5,761,327 | A | 6/1998 | Papritz |
| 5,781,206 | A | 7/1998 | Edge |
| 5,786,823 | A | 7/1998 | Madden |
| 5,816,151 | A | 10/1998 | Wang et al. |
| 5,832,109 | A | 11/1998 | Mahy |
| 5,835,244 | A | 11/1998 | Bestmann |
| 5,841,897 | A | 11/1998 | Numakura |
| 5,870,530 | A | 2/1999 | Balasubramanian |
| 5,877,787 | A | 3/1999 | Edge |
| 5,892,891 | A | 4/1999 | Dalal et al. |
| 5,933,578 | A | 8/1999 | Van de Capelle |
| 5,947,029 | A | 9/1999 | Loeffler et al. |
| 5,957,049 | A | 9/1999 | Ammeter et al. |
| 5,967,050 | A | 10/1999 | Seymour |
| 5,982,990 | A * | 11/1999 | Gondek ..................... 358/1.9 |
| 5,988,067 | A | 11/1999 | Ishida et al. |
| 5,991,511 | A | 11/1999 | Granger |
| 5,995,655 | A | 11/1999 | Lockett et al. |
| 6,027,201 | A | 2/2000 | Edge |
| 6,041,708 | A | 3/2000 | Kipphan et al. |
| 6,043,909 | A | 3/2000 | Holub |
| 6,061,501 | A | 5/2000 | Decker |
| 6,137,594 | A | 10/2000 | Decker |
| 6,157,735 | A | 12/2000 | Holub |
| 6,160,912 | A | 12/2000 | Usami |
| 6,192,801 | B1 | 2/2001 | Papritz et al. |
| 6,215,561 | B1 | 4/2001 | Kakutani |
| 6,215,562 | B1 | 4/2001 | Michel et al. |
| 6,229,580 | B1 * | 5/2001 | Inoue ..................... 348/649 |
| 6,230,622 | B1 | 5/2001 | Dilling |
| 6,281,984 | B1 | 8/2001 | Decker |
| 6,313,925 | B1 | 11/2001 | Decker |
| 6,360,007 | B1 | 3/2002 | Robinson |
| 6,377,366 | B1 | 4/2002 | Usami |
| 6,429,947 | B1 | 8/2002 | Laverty et al. |
| 6,441,920 | B1 | 8/2002 | Smith |
| 6,459,501 | B1 * | 10/2002 | Holmes ..................... 358/1.9 |
| 6,483,607 | B1 | 11/2002 | Van de Capelle et al. |
| 6,512,597 | B1 | 1/2003 | Cooper et al. |
| 6,519,055 | B1 | 2/2003 | Curry et al. |
| 6,523,468 | B1 | 2/2003 | Loffler |
| 6,575,095 | B1 | 6/2003 | Mahy |
| RE38,180 | E | 7/2003 | Edge |
| 6,615,729 | B2 | 9/2003 | Hauck |
| 6,698,860 | B2 | 3/2004 | Berns |
| 6,725,772 | B2 * | 4/2004 | Martinez et al. ............. 101/211 |
| 6,750,992 | B1 | 6/2004 | Holub |
| 6,947,177 | B2 * | 9/2005 | Smith ..................... 358/1.9 |
| 7,057,765 | B1 * | 6/2006 | Fischer et al. ................. 358/1.9 |
| 2003/0002061 | A1 | 1/2003 | Van de Capelle |
| 2003/0072016 | A1 | 4/2003 | Dalrymple |
| 2003/0089262 | A1 | 5/2003 | Martinez et al. |
| 2003/0090693 | A1 * | 5/2003 | Tezuka et al. ................. 358/1.9 |
| 2003/0098986 | A1 | 5/2003 | Pop |
| 2003/0156299 | A1 | 8/2003 | Martinez et al. |
| 2004/0125388 | A1 | 7/2004 | Platt |
| 2005/0280847 | A1 * | 12/2005 | Cairns et al. ................. 358/1.9 |
| 2006/0077210 | A1 * | 4/2006 | Morris et al. ............... 345/613 |
| 2006/0082844 | A1 * | 4/2006 | White ..................... 358/504 |

FOREIGN PATENT DOCUMENTS

| GB | 2213674 A * | 8/1989 |
| JP | 63254469 | 10/1988 |
| WO | WO 2004/017261 A2 | 2/2004 |
| WO | WO 2004017261 A2 * | 2/2004 |

OTHER PUBLICATIONS

T. Komatsu, T. Saito, Color Transformation and Interpolation for Direct Color Imaging with a Color Filter Array, Oct. 8-11, 2006, IEEE International Conference, Image Processing, pp. 3301-3304.*

I. Singh, P. Agathoklis, A. Antoniou, Lossless Compression of Color Images Using an Improved Integer-Based Nonlinear Wavelet Transform, Jun. 9-12, 1997, IEEE International Symposium, Circuits and Systems, vol. 4, pp. 2609-2612.*

Victor Ostromoukhov, Chromaticity Gamut Enhancement by Heptatone Multi-Color Printing, Jan. 31-Feb. 4, 1993, pp. 139-151, SPIE, vol. 1909, San Jose, California, USA.

"Stochastic Screening", promotional material from website of Edward Enterprises, Inc. (© 1995-1999).

*SWOP* (Specifications Web Offset Publications), Eighth Edition, by SWOP, Inc., NY, NY (1997).

Davis, M. and Davison, B., "Calculating the Net Effect," Publishing & Production Executive, pp. 25-32 (Aug. 1997).

"Graphic technology—Colour and transparency of ink sets for four-colour-printing," Part 1: Sheet-fed and heat-set web offset lithographic printing, *International Standard* (ISO 2846-1:1997(E)), First Edition, pp. 1-19 (Dec. 15, 1997).

Moretta, R., "Process Workflow White Paper, The easiest way to achieve brilliant results," PANTONE® *Hexachrome®* (Mar. 1998).

*The Color Guide and Glossary*, X-Rite, Incorporated, Grandville, Michigan (1998).

Adams, R. and Romano, F., *Computer-to-Plate Primer*, GATF Press. Pittsburgh (1999).

*General Requirements for Applications in Offset Lithography* (GRACoL™), Version 3.0, by Graphic Communications Association (© 1999).

Fenton, H., Adaption of article "Process Control: Missing LINK In," *Graphic Arts Monthly*/www.gammag.com, pp. 64-70 (Oct. 1999).

"Staccato Stochastic Screening Technology," promotional material from website of Creo Products, Inc. (© 2000).

Kohler, T., "ICC Achievements and Challenges," from website Http://222.color.org/iccach1.html of Canon information Systems.

"Harmony, Flexible Dot Gain Calibration Harmony Advantages," promotional material from website of Creo Products, Inc.

Adobe Photoshop 5.0 User Guide for Macintosh and Windows, Adobe Systems Incorporated, 1998, p. 127.

Tony Johnson, "An Effective Colour Management Architecture for Graphic Arts," London College of Printing, 2000, 13 pages.

Gary G. Field, "Color and Its Reproduction," Graphic Arts Technical Foundation, $2^{nd}$ ed., 1999, pp. 192-194, 405-406.

World Wide Web http://www.wasatchinc.com/digigrafix.gamut.html, "Color Gamut and Gamut Mapping," printed on Dec. 11, 2000, 3 pages.

David McDowell, et al, "To Chase the Press, . . . or Not to Chase the Press!" The Prepress Bulletin, Jul./Aug., 1997, pp. 16-18, 20.

World Wide Web, http://www.color.org/iccach1.html, Tim Kohler, "ICC Achievements and Challenges," printed Nov. 18, 2000, 6 pages.

World Wide Web, http://www.color.org/wpaper1.html, Michael Has, et al., "Color Management: Current Practice and The Adoption of a New Standard," printed Nov. 18, 2000, 15 pages.

World Wide Web, http://www.color.org/papers.html, Articles/Publications About ICC Profiles, printed Nov. 18, 2000, 2 pages.

International Search Report and Written Opinion of the international Searching Authority mailed Jun. 9, 2006 for PCT Application No. PCT/US2006/000404, 11 pages.

* cited by examiner

SYSTEM AND METHOD OF COLOR IMAGE TRANSFORMATION

BACKGROUND

In color reproduction systems, color transformation methods have been employed to compensate for colorant characteristics, reproduction system dissimilarities, subject matter requirements, and personal preferences of the operators and directors. Color transformation may be used to perform digitizing of color images, editing color images, and inter-device color control. There are two common approaches to color transformation, which is the eventual task of a general process known as "system feedback programming for color separation,": integrative approach and component approach (Gary G. Field, *Color & Its Reproduction*, $2^{nd}$ rev. edition, Gatf Press, Mar. 1, 1998). Currently, the prevailing approach in performing color transformation for inter-device color control is the integrative method. The integrative method uses lookup tables that define a device's characteristics by associating pairs of hypercube colorant coordinates and colorimetric measurement or mathematical calculation values of the resultant or predicted actual color appearance. The lookup table incorporates data integratively representative of the system's variables in tone-reproduction, gray-balance, and hue/saturation characteristics correction. However, a major disadvantage of the integrative approach is that once a reproduction system is characterized, the lookup tables are fixed and not readily modifiable to accommodate new non-integrated data representative of a wide variety of dynamic printing condition changes. In typical commercial printing environments, printing condition changes may include day-to-day or hour-to-hour paper stock variations that exhibit variable light scattering effect characteristics, paper color differences, proofs manufactured out of perfect tone-reproduction specifications, ambient climate changes around the printing device, and personal preferences of the on-press director, among others. These condition changes may alter some component characteristics but not others, and alter the component characteristics to varying degrees or differently.

The component approach, unlike the integrative approach, gives color specialists the ability to separately correct for the uniqueness of a color reproduction system's isolated one-reproduction, gray-balance, and hue/saturation characteristics or attributes. Traditional practice has show that the component approach can be an accommodating and expansive course of action in achieving high quality color separations in performing the tasks of digitizing and editing color images and it is reasonable to believe that this approach could also significantly improve the industry's performance of inter-device color control.

DETAILED DESCRIPTION

The terminology and acronyms used herein are defined as follows:

Actual Color—a color sample that can be visually perceived or measured by instruments.

Assimilated Accumulated Adjustment (AAA)—the sum of the seven MCA and the global ACA.

Applicable Curve Adjustment (ACA)—the absolute adjustment prescribed by the curve tables for a pixel value.

Calculated Percentages of Kinship (CPK)—the degree of affiliation a pixel stack's initial percent dot value has to a particular color family.

Color Families—defined regions on any color model, such as the intra-contiguous (within each Color Family) and inter-blending (between Color Families) red, yellow, green, cyan, blue, magenta, and neutral regions used in system 10. However, a Color Family may be defined using any color as its basis.

Conceptual Color—a theoretical color represented by a locus on a hypercube color model whose Actual Color is conditional and contingent on an infinite number of variables.

Control Set Point (CSP)—selected critical points across a full range of lightness values.

Hue—in relation to a standard hypercube color model, this attribute refers to a pixel stack's colorant coordinate's proximity to the base vertices of the hypercube color model without regard to the black and white vertices.

Initial Percent Dot Value (IPDV)—the initial, prior to transformation, dot percentage or 8-bit value corresponding to the overlapping pixels of a four-channel (cyan, magenta, yellow, black) pixel stack in the digital image file.

Inter-Device Color Control—the color management required to produce matching actual color on multiple color reproduction systems, each with distinct color printing characteristics (such as between a proofing device and a commercial production printing system).

Lightness—in relation to a standard hypercube color model, this attribute refers to a pixel stack's proximity to the base vertex of the white vertex. The base vertex of each Color Family is considered to be zero lightness except that the neutral Color Family's black vertex is considered to be zero lightness and the white vertex is considered to be 100% lightness.

Modified Curve Adjustment (MCA)—is calculated by multiplying the ACA with the CPK (ACA*CPK).

Percent Dot Value Color Correction Factor (PDCCF)—the color correction adjustment values in percent dot for printing applications.

Pixel Stack—a conceptual color having four color channels (cyan, magenta, yellow and black) of a pixel in a digital image file.

Saturation—In relation to a standard hypercube color model, this attribute refers to a pixel stack's proximity to the neutral Color Family. A Pixel Stack that is 100% proximate to the neutral Color Family is considered to have zero saturation. A pixel stack that is 100% proximate to a Color Family other than the neutral Color Family is considered to have 100% saturation.

Figure 1:
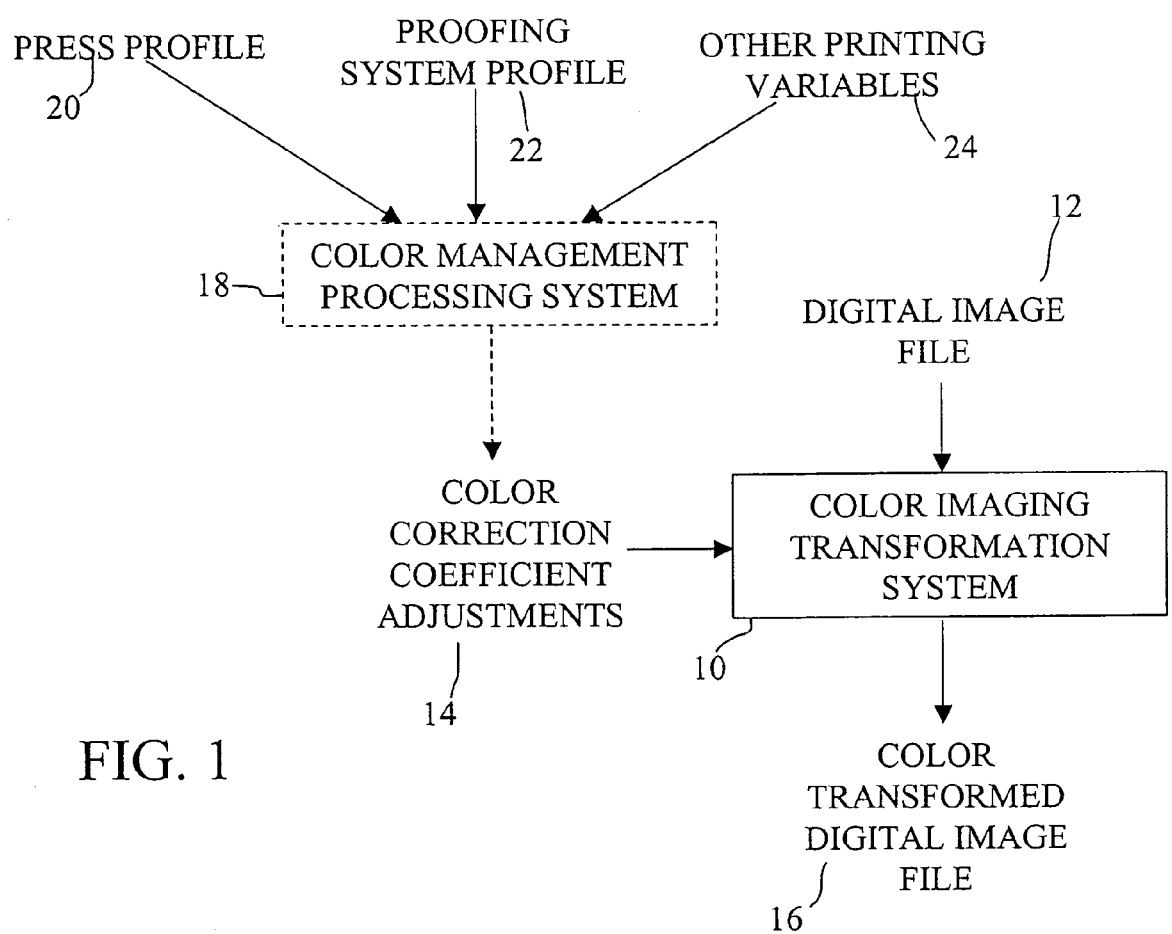
FIG. 1 is a simplified block diagram of an embodiment of a system and method of color imaging transformation.

FIG. 1 is a simplified block diagram of an embodiment of a system and method of color imaging transformation 10. Color imaging transformation system 10 accepts a digital image file 12 and Color Correction Coefficient Adjustments 14 to generate a color transformed digital image file 16. Color Correction Coefficient Adjustments 14 are adjustments that may be made to selected ones of seven Color Families, including cyan (C), magenta (M), yellow (Y), red (R), green (G), blue (B), and neutral. An additional color correction coefficient adjustment that may be applied is a global coefficient adjustment value. Color Correction Coefficient Adjustments may be thought of as points on a transfer curve that maps input tone values to output tone values. Correction Coefficient Adjustments 14 may be expressed as Percent Dot Color Correction Factors (PDCCFs) in applications more specifically pertaining to inter-device color control, such as between a proofing device and a production printing device. PDCCF and a color management processing system 18 for generating PDCCFs and methods thereof are described in more detail in U.S. Pat. No. 6,725,772, U.S. Patent Application Publication No. 2003/0156299, and U.S. Patent Publication No. 2003/0058462, all commonly assigned to the Ackley Martinez Company dba MGI Studio and incorporated herein by reference. Color management processing system 18 receives, as input, a printing device profile 20, proofing device profile 22, and other printing variables 24, and generates the PDCCFs 14. Because color management processing system 18 is only one example of a source of color correction coefficient adjustments 14, it is shown in phantom in FIG. 1.

In addition to inter-device color control, system 10 may also be used for digitizing color images and editing digitized color images. The color imaging transformation system and method described herein apply a multidimensional transformation and a one-dimensional global transformation to each pixel by taking into account the interaction between the values of the corresponding pixels in a Pixel Stack of a multichannel digitized image file. In one-dimensional transformations the global coefficient adjustment is applied unconditionally to all of the hypercube colorant coordinate values. In multidimensional transformation, the color corrections or adjustments are performed in accordance to a Pixel Stack's kinship or proximity to the Color Family being addressed by the correction. This is better explained by also referring to a standard hypercube color model 30, shown in FIG. 3, and an aberrated hypercube color model 70, a conceptual representative diagram thereof is shown in FIG. 4.

Figure 3:
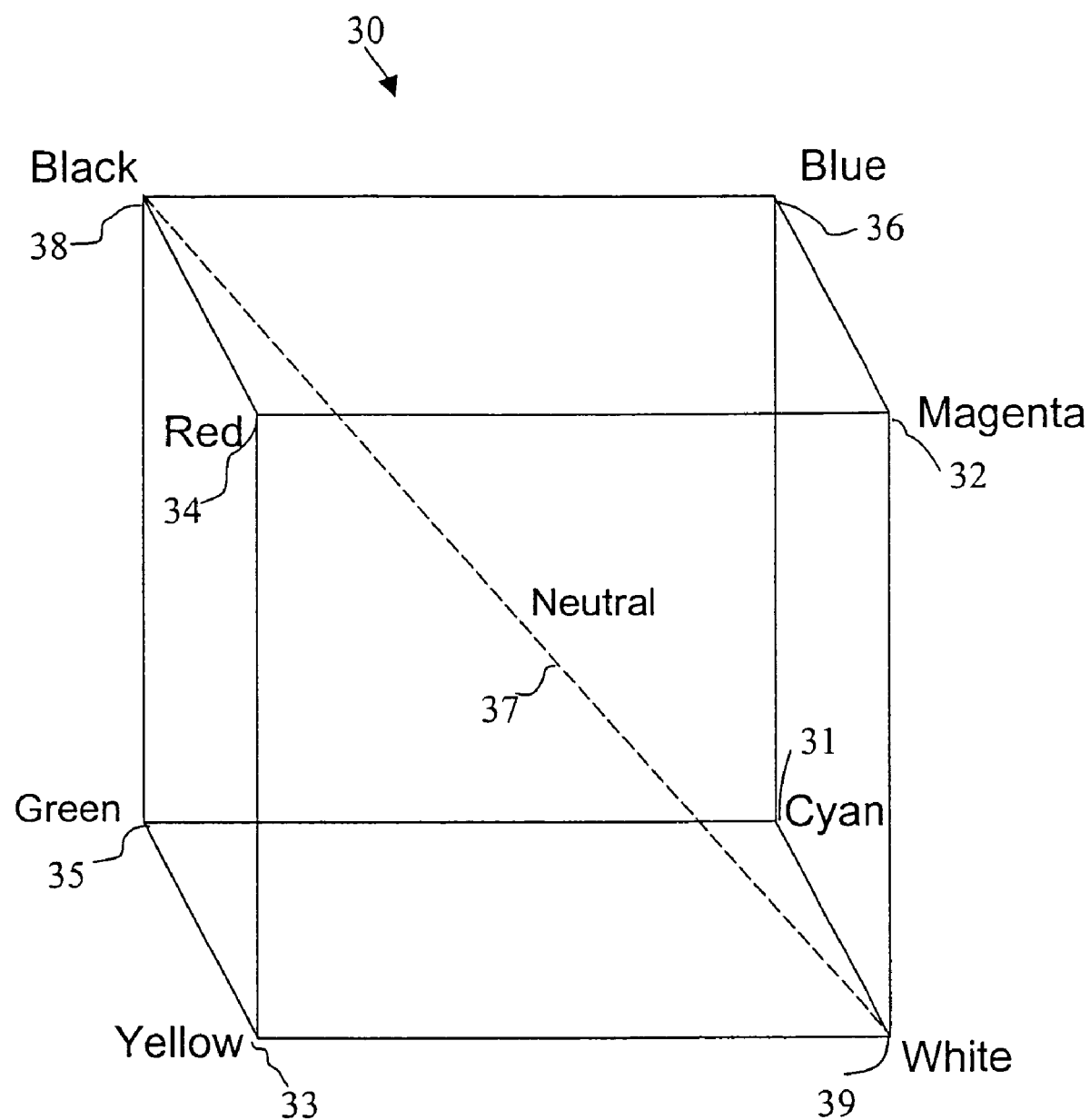
FIG. 3 is a conceptual representative diagram of a hypercube color model.

As shown in FIG. 3, hypercube color model 30 is a standard four-dimensional model where each achievable conceptual color occupies a three-coordinate locus and each vertex of the hypercube color model 30 occupies the base locus of seven intra-contiguous (within each Color Family) and inter-blending (between Color Families) Color Families (cyan 31, magenta 32, yellow 33, red 34, green 35, blue 36), and where the neutral Color Family is represented by a diagonal 37 between black and white vertices 38 and 39. In addition to being three of the seven Color Families, cyan, magenta and yellow are also considered the primary colorants, whose component values equal the three-coordinate loci, that create the hypercube color model and the four other Color Families are combinations of cyan, magenta and yellow. Each achievable conceptual color's three-coordinate values may be used to calculate three attributes of color—hue, saturation, and lightness. The lightness factor represents the fourth dimension of the hypercube. For the purpose of describing system 10, the color model 30 may be visualized as constructed of eight-bit code pixel values (0-255) or surface area coverage percentages (100-0) and is representative of the achievable conceptual colors that may appear on an eight-bit defined digital image. Any point in this color coordinate system may be affiliated with one, two or three Color Families, but no more than three. The correction of any color is performed by applying the Color Correction Coefficient Adjustment values of each of the Color Families to which it is affiliated with, in direct proportion to the degree of affiliation. The total degree of affiliation to the Color Families is 100%, which means that 100% of the effect of the transfer curves or Color Correction Coefficient Adjustment values are applied in the color transformation. The hypercube colorant coordinate values, defined in surface area coverage percentages and/or 8-bit pixel depth data, are considered fixed values independent of all of printing devices' resultant actual color which may be represented by VCMY color density values, where V is the description of the color translated to an achromatic (i.e. gray) value which is primarily used to describe the black ink color, C is the description of the red wavelength region of the color spectrum which is complemented by the cyan ink color, M is the description of the green wavelength region of the color spectrum which is complemented by the magenta ink color, and Y is the description of the blue wavelength region of the color spectrum which is complemented by the yellow ink color.

Figure 4:
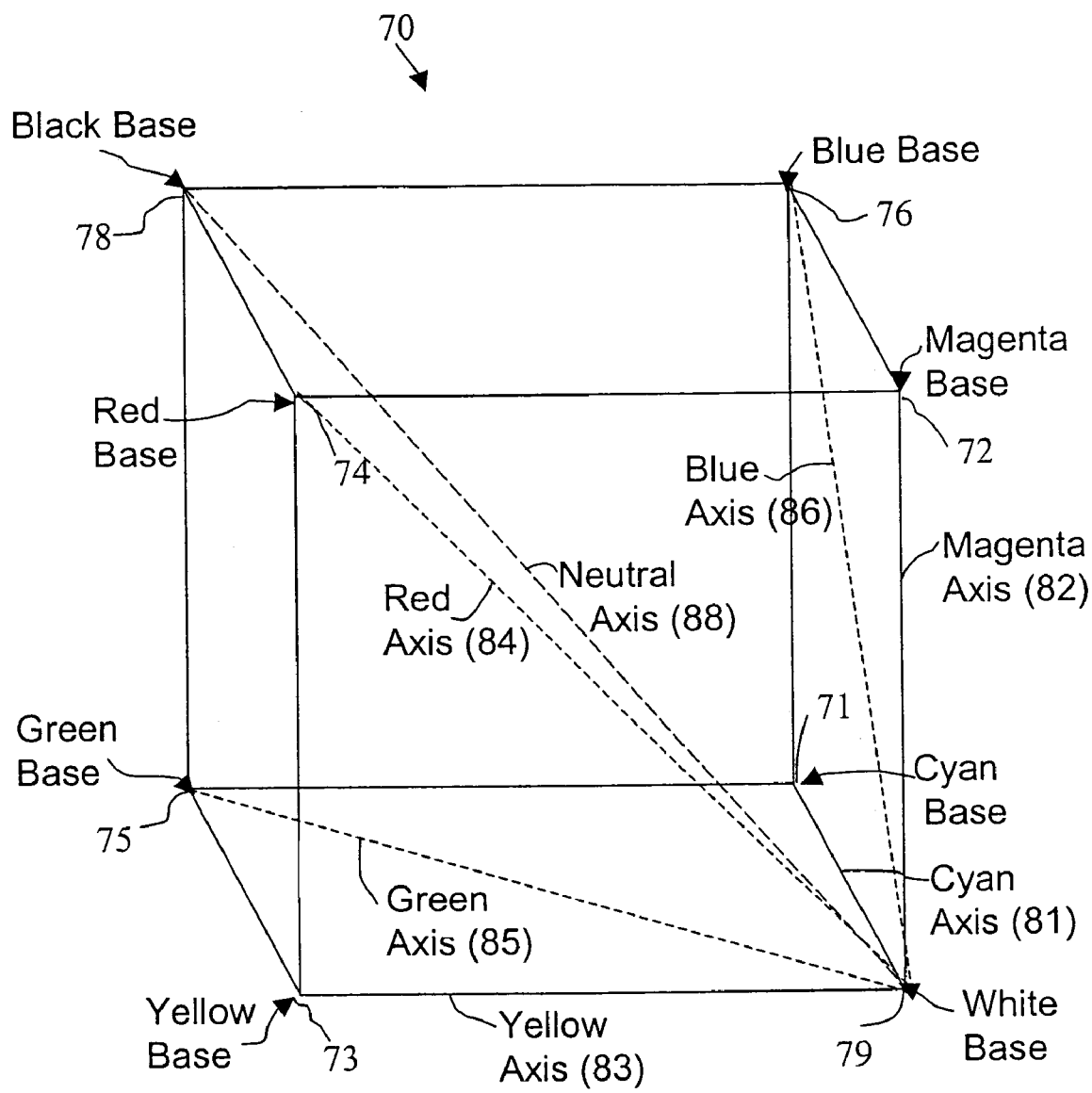
FIG. 4 represents a special purpose conception within system 10 of an aberrated hypercube color model.

FIG. 4 represents a special purpose conception within system 10 of an aberrated hypercube color model 70. The aberration is brought about in that the coordinate values are defined in eight-bit values, as normal, but then the coordinates may not be translated to surface area coverage percentages as common in conventional color theory. Also, the fourth dimension, lightness, is annulled (zero) in aberrated hypercube color model 70. The aberrated hypercube color model 70 may be used to visually represent the relationship between seven intra-contiguous (within each Color Family) and inter-blending (between Color Families) Color Families, including cyan (C), magenta (M), yellow (Y), red (R), green (G), blue (B), and neutral. In the aberrated hypercube color model 70, the cyan Color Family base locus occupies vertex 71; the magenta Color Family base locus occupies vertex 72; the yellow Color Family base locus occupies vertex 73; the red Color Family base locus occupies vertex 74; the green Color Family base locus occupies vertex 75; the blue Color Family base locus occupies vertex 76; and for the neutral Color Family base loci, black occupies vertex 78 and white occupies vertex 79.

Referring to both FIG. 3 and FIG. 4, the base locus coordinate values in the Color Families are defined as follows:

TABLE A

| Color Family | Hypercube Colorant Coordinate Values (in percent dot surface area coverage) C = Cyan, M = Magenta, Y = Yellow |
| --- | --- |
| Neutral | C = 100%, M = 100%, Y = 100% and C = 0%, M = 0%, Y = 0% |
| Red | C = 0%, M = 100%, Y = 100% |
| Yellow | C = 0%, M = 0%, Y = 100% |
| Green | C = 100%, M = 0%, Y = 100% |
| Cyan | C = 100%, M = 0%, Y = 0% |
| Blue | C = 100%, M = 100%, Y = 0% |
| Magenta | C = 0%, M = 100%, Y = 0% |

TABLE A shows the color base and the color family axis full intensity percentages. From the above table, the bases for the Calculated Percentage of Kinship (CPK) equations, described below, are established. For the neutral Color Family, the cyan basis, magenta basis, and yellow basis are set to 100%; for the red Color Family, the cyan basis is set to zero and the magenta basis and yellow basis are each set to 100%; for the yellow Color Family, the cyan basis and the magenta basis are each set to zero, and the yellow basis is set to 100%; for the green Color Family, the cyan basis and the yellow basis are each set to 100%, and the magenta basis is set to zero; for the cyan Color Family, the cyan basis is set to 100% and the magenta basis and yellow basis are each set to zero; for the blue Color Family, the cyan basis and the magenta basis are each set to 100%, and the yellow basis is set to zero; and for the magenta Color Family, the cyan basis and yellow basis are each set to zero, and the magenta basis is set to 100%. Details of calculation of a pixel's kinship to Color Families are set forth below.

It may be seen that color family axes are also defined in aberrated hypercube model 70. A color family axis is the imaginary line intersecting full intensity values of that Color Family between the color base and the white base in the aberrated hypercube color model 70. Cyan axis 81 spans between cyan base 71 and white base 79; magenta axis 82 spans between magenta base 72 and white base 79; yellow axis 83 spans between yellow base 73 and white base 79; red axis 84 spans between red base 74 and white base 79; green axis 85 spans between green base 75 and white base 79; blue axis 86 spans between blue base 76 and white base 79; and the neutral axis 88 spans between black base 78 and white base 79. The Aberrated hypercube color model 70 may be consulted for executing the function of determining a degree of affiliation for each locus on the standard hypercube in FIG. 3, to each of the seven Color Families. In this concept, aberrated hypercube color model 70 has only full intensity conceptual color percent values at standard 8-bit coordinates and represents the preconceived notion of annulling the lightness attribute of every conceptual color except (0,0,0)=(C,M,Y percent) which remains white. The seven Color Families, neutral (black), cyan, magenta, yellow, red, blue, green, remain individually intra-contiguous and collectively inter-blending regions that populate the model seamlessly. In the context of the aberrated hypercube model 70, the term "full intensity" means at least one of the C, M, Y components is 100% as seen in TABLE A above. To further describe the aberrated hypercube color model 70, TABLE B below shows:

TABLE B

| Color Family | Hypercube 8-bit Loci | | |
|---|---|---|---|
| | Cyan | Magenta | Yellow |
| Black (Neutral) | 254 | 254 | 254 |
| Red | 255 | 254 | 254 |
| Yellow | 255 | 255 | 254 |
| Green | 254 | 255 | 254 |
| Cyan | 254 | 255 | 255 |
| Blue | 254 | 254 | 255 |
| Magenta | 255 | 254 | 255 |
| White | 255 | 255 | 255 |

The values in TABLE B represent the last 8-bit locus in each Color Family axis adjacent to white base 79.

Figure 2:
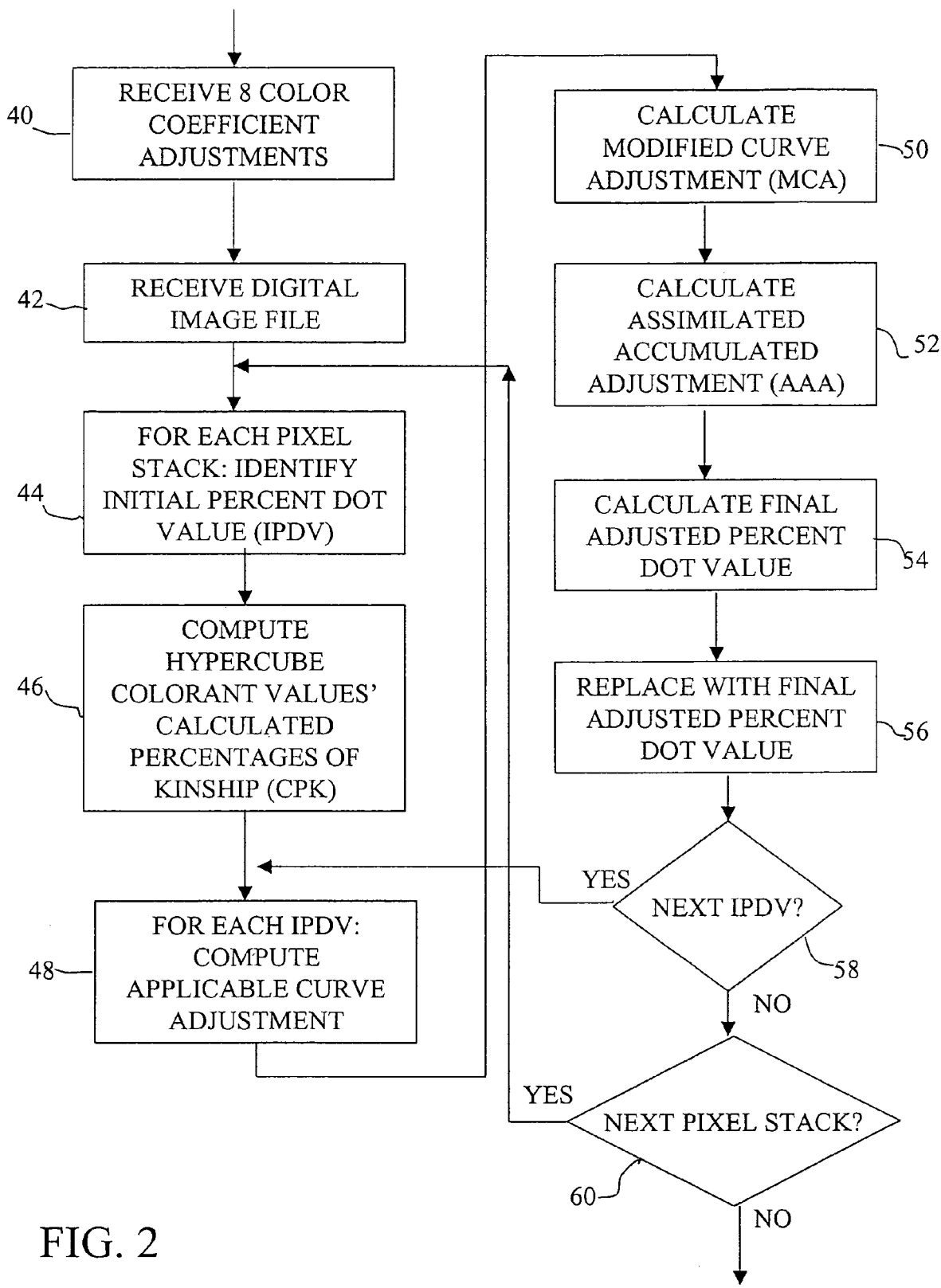
FIG. 2 is a flowchart of an embodiment of a method of color imaging transformation.

FIG. 2 is a flowchart of an embodiment of a method of color imaging transformation. In step 40, eight sets of Color Correction Coefficient Adjustments or transfer curve sets are received. These eight sets of Color correction coefficient adjustment values are absolute adjustments and represent one for each of the seven Color Families which are based on calculations supporting channel interaction sensitivity, plus one additional global coefficient adjustment that is not based on calculations supporting channel interaction sensitivity. The curve sets are defined at selected control set points (CSPs) such as 0, 5, 10, 25, 50, 75, 90, and 100, for example. Exemplary hypothetical color correction coefficient adjustment values are provided below in TABLES C through J.

TABLE C

Neutral Color Family

| CSP% | Cyan | Magenta | Yellow | Black |
|---|---|---|---|---|
| 100 | −10.0 | −10.0 | −10.0 | −10.0 |
| 90 | −9.0 | −9.0 | −9.0 | −9.0 |
| 75 | −7.5 | −7.5 | −7.5 | −7.5 |
| 50 | −5.0 | −5.0 | −5.0 | −5.0 |
| 25 | −2.5 | −2.5 | −2.5 | −2.5 |
| 10 | −1.0 | −1.0 | −1.0 | −1.0 |
| 5 | −.5 | −.5 | −.5 | −.5 |
| 0 | 0.0 | 0.0 | 0.0 | 0.0 |

TABLE D

Red Color Family

| CSP% | Cyan | Magenta | Yellow | Black |
|---|---|---|---|---|
| 100 | −10.0 | −10.0 | −10.0 | −10.0 |
| 90 | −9.0 | −9.0 | −9.0 | −9.0 |
| 75 | −7.5 | −7.5 | −7.5 | −7.5 |
| 50 | −5.0 | −5.0 | −5.0 | −5.0 |
| 25 | −2.5 | −2.5 | −2.5 | −2.5 |
| 10 | −1.0 | −1.0 | −1.0 | −1.0 |
| 5 | −.5 | −.5 | −.5 | −.5 |
| 0 | 0.0 | 0.0 | 0.0 | 0.0 |

TABLE E

Yellow Color Family

| CSP% | Cyan | Magenta | Yellow | Black |
|---|---|---|---|---|
| 100 | −10.0 | −10.0 | −10.0 | −10.0 |
| 90 | −9.0 | −9.0 | −9.0 | −9.0 |
| 75 | −7.5 | −7.5 | −7.5 | −7.5 |
| 50 | −5.0 | −5.0 | −5.0 | −5.0 |
| 25 | −2.5 | −2.5 | −2.5 | −2.5 |
| 10 | −1.0 | −1.0 | −1.0 | −1.0 |
| 5 | −.5 | −.5 | −.5 | −.5 |
| 0 | 0.0 | 0.0 | 0.0 | 0.0 |

TABLE F

Green Color Family

| CSP% | Cyan | Magenta | Yellow | Black |
|---|---|---|---|---|
| 100 | −10.0 | −10.0 | −10.0 | −10.0 |
| 90 | −9.0 | −9.0 | −9.0 | −9.0 |
| 75 | −7.5 | −7.5 | −7.5 | −7.5 |
| 50 | −5.0 | −5.0 | −5.0 | −5.0 |
| 25 | −2.5 | −2.5 | −2.5 | −2.5 |
| 10 | −1.0 | −1.0 | −1.0 | −1.0 |
| 5 | −.5 | −.5 | −.5 | −.5 |
| 0 | 0.0 | 0.0 | 0.0 | 0.0 |

TABLE G

Cyan Color Family

| CSP% | Cyan | Magenta | Yellow | Black |
|---|---|---|---|---|
| 100 | −10.0 | −10.0 | −10.0 | −10.0 |
| 90 | −9.0 | −9.0 | −9.0 | −9.0 |
| 75 | −7.5 | −7.5 | −7.5 | −7.5 |
| 50 | −5.0 | −5.0 | −5.0 | −5.0 |
| 25 | −2.5 | −2.5 | −2.5 | −2.5 |
| 10 | −1.0 | −1.0 | −1.0 | −1.0 |

TABLE G-continued

Cyan Color Family

| CSP% | Cyan | Magenta | Yellow | Black |
|---|---|---|---|---|
| 5 | −.5 | −.5 | −.5 | −.5 |
| 0 | 0.0 | 0.0 | 0.0 | 0.0 |

TABLE H

Blue Color Family

| CSP% | Cyan | Magenta | Yellow | Black |
|---|---|---|---|---|
| 100 | −10.0 | −10.0 | −10.0 | −10.0 |
| 90 | −9.0 | −9.0 | −9.0 | −9.0 |
| 75 | −7.5 | −7.5 | −7.5 | −7.5 |
| 50 | −5.0 | −5.0 | −5.0 | −5.0 |
| 25 | −2.5 | −2.5 | −2.5 | −2.5 |
| 10 | −1.0 | −1.0 | −1.0 | −1.0 |
| 5 | −.5 | −.5 | −.5 | −.5 |
| 0 | 0.0 | 0.0 | 0.0 | 0.0 |

TABLE I

Magenta Color Family

| CSP% | Cyan | Magenta | Yellow | Black |
|---|---|---|---|---|
| 100 | −10.0 | −10.0 | −10.0 | −10.0 |
| 90 | −9.0 | −9.0 | −9.0 | −9.0 |
| 75 | −7.5 | −7.5 | −7.5 | −7.5 |
| 50 | −5.0 | −5.0 | −5.0 | −5.0 |
| 25 | −2.5 | −2.5 | −2.5 | −2.5 |
| 10 | −1.0 | −1.0 | −1.0 | −1.0 |
| 5 | −.5 | −.5 | −.5 | −.5 |
| 0 | 0.0 | 0.0 | 0.0 | 0.0 |

TABLE J

Global

| CSP% | Cyan | Magenta | Yellow | Black |
|---|---|---|---|---|
| 100 | −10.0 | −10.0 | −10.0 | −10.0 |
| 90 | −9.0 | −9.0 | −9.0 | −9.0 |
| 75 | −7.5 | −7.5 | −7.5 | −7.5 |
| 50 | −5.0 | −5.0 | −5.0 | −5.0 |
| 25 | −2.5 | −2.5 | −2.5 | −2.5 |
| 10 | −1.0 | −1.0 | −1.0 | −1.0 |
| 5 | −.5 | −.5 | −.5 | −.5 |
| 0 | 0.0 | 0.0 | 0.0 | 0.0 |

The CSP % in TABLES C through J refers to control set points, which are selected critical points across a full range of lightness values. The calculation of the Color Correction Coefficient Adjustments made herein to the digitized image file is not affected by the lightness attribute of the color. In other words, only hue and saturation attributes are considered so that a Pixel Stack's IPDV, regardless of its lightness attribute, is corrected to the full degree or extent of the color correction coefficient adjustment values.

In step 42, a digital image file 12 is also received. Digital image file 12 (FIG. 1) is a file containing digital data representative of an image. The image may be a photograph, a scanned digital image, an artistic expression created with a software application, or any image. Typically, the digital image file includes an 8-bit code for each conceptual color. The color described is considered to be conceptual since the actual color produced by this file is determined to a great extent by the reproduction characteristics of the selected color preproduction system, i.e. a printing device. A conversion may be performed to convert the 8-bit code to percent dot value. A lookup table may be used for the 8-bit to percent dot conversion, where for example, a value of 255 in 8-bit code is converted to 0.00 in percent dot value, a value of 242 in 8-bit code is converted to 5.10 in percent dot value, a value of 191 in 8-bit code is converted to 25.10 in percent dot value, a value of 128 in 8-bit code is converted to 49.80 in percent dot value, a value of 64 in 8-bit code is converted to 74.90 in percent dot value, a value of 27 in 8-bit code is converted to 89.41 in percent dot value, a value of 0 in 8-bit code is converted to 100.00 in percent dot value, etc. An equation that may be used to convert the 8-bit code to percent dot value is:

$$\text{Percent Dot Value} = (100/255)*(255-(\text{8-bit code}))$$

The percent dot values are calculated to 13 decimal points and the values set forth above are truncated to two decimal points for illustration purposes only. System 10 may be adapted to receive a digital image file 12 in a format other than CMYK such as CMY or RGB.

In step 44, the Initial Percent Dot Values (IPDVs) of the image file's first Pixel Stack, where each Pixel Stack consisting of four color channels (CMYK) are selected for processing. The term Initial Percent Dot Values or IPDVs is defined as the initial, prior to color correction transformation, dot percentage or 8-bit values corresponding to the overlapping pixels of a four-channel (cyan, magenta, yellow, black) pixel stack in the digital image file. In step 46, the hypercube colorant values' Calculated Percentage of Kinship (CPK) to each of seven intra-contiguous and inter-blending Color Families (neutral, red, blue, green, cyan, yellow, magenta) is determined. In other words, the degree of affiliation to as many as three Color Families and not less than one for the current Pixel Stack is determined. The inherent features of the algorithms described in FIG. 2, conceptually and in a practical sense, subdivide the Hypercube Color Model into seven individually intra-contiguous and collectively inter-blending regions or Color Families (neutral, cyan, magenta, yellow, red, blue, green) that populate the model seamlessly. This enables the application of precisely intermeshing correction coefficient absolute adjustments by means of color transfer curves. The transfer curves being one set of CMYK for each Color Family. The practical effect is newfound robustness in precisely achieving user-desired color transformation in performing inter-device color control, image digitizing and image editing tasks. For example, system 10 has the power to apply seven Color Family transfer curve sets, composed by simple arithmetic, that will predicatably transform any and all pixel values (greater than 0,0,0=C,M,Y percent) of a typical CMY digital image to a targeted 50% value (or any other targeted percentage value). This specific demonstration of unusual capability, although not likely to be used in real-world practice, is a telling indicator of system 10 algorithm's capacity to enable the application of seven Color Family transfer curves to connect and combine precisely and seamlessly encompassing the entire color model. In the CPK calculation step, the calculation is done utilizing three of the four IPDVs (C, M, Y) of the current Pixel Stack considered as a unit. The K value may be effectively absent from this calculation based on the logic that black colorant in a Color Sample is self-canceling since in theory, and substantially in practice, it contributes equal amounts of VCMY density to a color. An exemplary algorithm for the CPK calculation is as follows:

1. Set CyCur, MaCur, and YeCur to the current C, M and Y IPDVs
2. Set HighBas to 100
3. Set HighCur to the highest value of the set (CyCur, MaCur, YeCur), Set MidCur to the middle value of the set (CyCur, MaCur, YeCur), Set LowCur to the lowest value of the set (CyCur, MaCur, YeCur), where CyCur is the cyan IPDV, MaCur is the magenta IPDV, and YeCur is the yellow IPDV
4. Compute the General Step Product: Gsp=HighBas/HighCur After the general calculations set forth above, the neutral family CPK may be determined by:
1. Set CyBas=100, MaBas=100, YeBas=100
2. Compute S1P=(LowCur*Gsp)/HighBas
3. Compute S2P=(((HighBas−(MidCur*Gsp))/100)+1)*S1P
4. Compute Neutral CPK=S2P*100

The variable HighBas is used in the computation because CyBas=100, MaBas=100, YeBas=100.

The following exemplary algorithm may be used to determine the red, green and blue color families' CPK:
1. After the general calculations set forth above, set the following variable values depending on which Color Family is being calculated:
   Red:
   CyBas=0
   MaBas=100
   YeBas=100
   LowCurCwh=Lowest value of the set (MaCur, YeCur)
   HighCurCwh=Highest value of the set (MaCur, YeCur)
   CurCwl=CyCur because CyBas=0
   Green:
   CyBas=100
   MaBas=0
   YeBas=100
   LowCurCwh=Lowest value of the set (CyCur, YeCur)
   HighCurCwh=Highest value of the set (CyCur, YeCur)
   CurCwl=MaCur because MaBas=0
   Blue:
   CyBas=100
   MaBas=100
   YeBas=0
   LowCurCwh=Lowest value of the set (CyCur, MaCur)
   HighCurCwh=Highest value of the set (CyCur, MaCur)
   CurCwl=YeCur because YeBas=0
2. Compute S1P=(HighCurCwh*Gsp)/HighBas
3. Compute S2P=HighBas/(HighCurCwh*Gsp), If S2P>100, set S2P to 100
4. Compute intermediate S3P=Absolute Value of ((LowCurCwh*Gsp)−(HghCurcwh*Gsp))*S2P, If S3P>100, set S3P to 100
5. Compute final S3P=(1−(S3P/100))*S1P
6. Compute first intermediate S4P=(HighCurCwh*Gsp)/(LowCurCwh*Gsp), If S4P<0.40, set S4P to 0.40
7. Compute second intermediate S4P=S4P*(CurCwl*Gsp)*S2P, If S4P>100, set S4P to 100
8. Compute final S4P=(1−(S4P/100))*S3P
9. Red, Green, or Blue CPK=S4P*100

The following exemplary algorithm may be used to determine the cyan, magenta and yellow color families' CPK:
1. After the general calculations set forth above, set the following variable values depending on which Color Family is being calculated:
   Cyan:
   CyBas=100
   MaBas=0
   YeBas=0
   LowCurCwl=Lowest value of the set (MaCur, YeCur)
   HighCurCwl=Highest value of the set (MaCur, YeCur)
   CurCwh=CyCur because CyBas=100
   Magenta:
   CyBas=0
   MaBas=100
   YeBas=0
   LowCurCwl=Lowest value of the set (CyCur, YeCur)
   HighCurCwl=Highest value of the set (CyCur, YeCur)
   CurCwh=MaCur because MaBas=100
   Yellow:
   CyBas=0
   MaBas=0
   YeBas=100
   LowCurCwl=Lowest value of the set (CyCur, MaCur)
   HighCurCwl=Highest value of the set (CyCur, MaCur)
   CurCwh=YeCur because YeBas=100
2. Compute S1P=(CurCwh*Gsp)/HighBas
3. Compute S2P=HighBas/(CurCwh*Gsp), If S2P is >100, set S2P to 100
4. Compute S3P=HighCurCwl*Gsp*S2P, If S3P>100, set S3P to 100
5. Compute intermediate S3P=(1−(S3P/100))*S1P
6. Compute intermediate S4P=LowCurCwl*Gsp*S2P, If S4P>100, set S4P to 100
7. Compute final S4P=(1−(S4P/100))*S3P
8. Cyan, Magenta, or Yellow CPK=S4P*100

The variables referenced above are defined as follows: Cycur is the cyan IPDV, MaCur is the magenta IPDV, YeCur is the yellow IPDV, HighCur is the highest value of the set (CyCur, MaCur, YeCur), MidCur is the middle value of the set (CyCur, MaCur, YeCur), LowCur is the lowest of the set (CyCur, MaCur, YeCur), CyBas is the cyan basis that is set to zero or 100 depending on the Color Family being calculated, MaBas is the magenta basis that is set to zero or 100 depending on the Color Family being calculated, YeBas is the yellow basis that is set to zero or 100 depending on the Color Family being calculated, HighBas is the high basis that is always set to 100.

The following variables are used in the calculation for the red, green and blue Color Families: LowCurCwh is the lower of the two current IPDVs of magenta and yellow for the red Color Family, cyan and yellow for the green Color Family, or cyan and magenta for the blue Color Family; HighCurCwh is the higher of the two current IPDVs of the two current percent dot values of magenta and yellow for the red Color Family, cyan and yellow for the green Color Family, or cyan and magenta for the blue Color Family; CurCwl is the current cyan IPDV for the red Color Family calculation, the current magenta IPDV for the green Color Family calculation, or the current yellow IPDV for the blue Color Family calculation.

The following variables are used in the calculation for the cyan, magenta and yellow Color Families: LowCurCwl is the lower of the two current IPDVs of magenta and yellow for the cyan Color Family, cyan and yellow for the magenta Color Family, or cyan and magenta for the yellow Color Family; HighCurCwl is the higher of the two current IPDVs of the two current IPDVs of magenta and yellow for the cyan Color Family, cyan and yellow for the magenta Color Family, or cyan and magenta for the yellow Color Family; CurCwh is the current cyan IPDV for the cyan Color Family calculation, the current magenta IPDV for the magenta Color Family calculation, or the current yellow IPDV for the yellow Color Family calculation.

Also in step 46, the CPK to the color families of each IPDV is computed. A Conceptual Color can be related or have affiliation with one, two, or three Color Families, and the sum of the percent affiliation of the one, two or three Color Families will total 100%. The color correction to be applied in the color image transformation is done according to the conceptual color's affiliation or kinship to a particular Color Family in direct proportion with the amount of affiliation with that color family. As discussed above, the attribute of lightness does not affect or enter into this color correction process. For example, a color having an IPDV of (C, M, Y, K)=(0, 5, 5, 0) is a very light red tint. A color having an IPDV of (C, M, Y, K)=(0, 100, 100, 0) is a very intense red color. Conventional color transformation systems and methods would correct the first red color 5% and the second red color 100% of a conventional transfer curve's absolute adjustments, for example. However, the color correction or transformation of system 10 would correct both red colors to the full extent of a conventional transfer curve's absolute adjustments because the CPK to the red color family for both colors is the same or 100%. Additional examples of CPK values for exemplary CMYK values are shown in the following table K:

TABLE K

| IPDV | | | | Calculated Percent Kinship | | | | | | |
|---|---|---|---|---|---|---|---|---|---|---|
| C | M | Y | K | Neutral | Red | Yellow | Green | Cyan | Blue | Magenta |
| 77.0 | 63.0 | 68.0 | 32.0 | 91.38 | 0.00 | 0.00 | 6.49 | 2.13 | 0.00 | 0.00 |
| 22.0 | 93.0 | 87.0 | 11.0 | 25.18 | 69.89 | 0.00 | 0.00 | 0.00 | 0.00 | 4.93 |
| 7.0 | 17.0 | 94.0 | 4.0 | 13.55 | 10.64 | 75.81 | 0.00 | 0.00 | 0.00 | 0.00 |
| 96.0 | 27.0 | 84.0 | 13.0 | 31.64 | 0.00 | 0.00 | 59.38 | 8.98 | 0.00 | 0.00 |
| 93.0 | 16.0 | 8.0 | 2.0 | 15.72 | 0.00 | 0.00 | 0.00 | 75.67 | 8.61 | 0.00 |
| 98.0 | 88.0 | 14.0 | 4.0 | 15.74 | 0.00 | 0.00 | 0.00 | 8.75 | 75.51 | 0.00 |

In step 48, the Applicable Curve Adjustment (ACA) values for the seven Color Families and the Global value for each IPDV are determined. The two closest control set points (LowCSP and HighCSP) to the current IPDV is determined, and then the ACA is computed by:

$$ACA = LowCSPAbsAdj + [(CurrIPDV - LowCSP) \times ((HighCSPAbsAdj - LowCSPAbsAdj)/(HighCSP - LowCSP))],$$

where CurrIPDV is the current IPDV, LowCSP is the lower control set point closest to the current IPDV, HighCSP is the higher control set point closest to the current IPDV, LowCSPAbsAdj is Color Correction Coefficient Adjustment value at the low CSP, HighCSPAbsAdj is Color Correction Coefficient Adjustment value at the high CSP. This step in essence performs linear interpolation to get the adjustment needed from interpolating from the two nearest control set points.

In step 50, the Modified Curve Adjustment (MCA) values for the seven Color Families for each IPDV are determined. The MCA is the Applicable Curve Adjustment determined in step 48 multiplied by Calculated Percent Kinship determined in step 46, or (ACA*CPK). In this manner, the resultant curve adjustments take into account the degree of affiliation to each Color Family. An MCA is not calculated for the global curve set since it is a one-dimensional adjustment calculated without regard for channel interaction effects. In other words, on the global curve set the CPK is always considered to be 100%. In step 52, the Assimilated Accumulated Adjustment (AAA) is determined by combining or summing the seven MCAs, one for each of the color families, and one global ACA. In step 54, the final adjusted percent dot value is computed by applying the adjustment value to the IPDV. Steps 50 through and 54 can be summarized by:

Final Adjusted $PDV = IPDV + [(\text{Neutral } ACA \times \text{Neutral } CPK/100) + (\text{Red} ACA \times \text{Red} CPK/100) + (\text{Yellow} ACA \times \text{Yellow} CPK/100) + (\text{Green} ACA \times \text{Green} CPK/100) + (\text{Cyan} ACA \times \text{Cyan} CPK/100) + (\text{Blue} ACA \times \text{Blue} CPK/100) + (\text{Magenta} ACA \times \text{Magenta} CPK/100) + (TRGlobal ACA)]$ It may be seen that all effective correction coefficient absolute adjustments, one-dimensional and multi-dimensional, are applied together once to the IPDV, thereby making the process more efficient than a sequential application of the correction factors. This efficiency increase over conventional color transformation is primarily enabled by system 10 algorithm annulling of the Conceptual Color's lightness attribute effects. In step 56, the current IPDV is replaced by the calculated Final Adjusted PDV in the pixel stack in the digital image file. In step 58, the next IPDV in the Pixel Stack is color corrected in the same manner by looping back to step 48. Once all four IPDVs for the current Pixel Stack are color corrected, the next pixel stack in the digital image file is processed similarly by looping back to step 44, until all pixel stacks in the digital image file have been color corrected. Exemplary values for the computations performed in steps 46-56 are shown in TABLE L below:

TABLE L

| Pixel Stack | CPK .13 Neutral | CPK 0.0 Red | CPK 0.0 Yellow | CPK 0.0 Green | CPK .27 Cyan | CPK .60 Blue | CPK 0.0 Magenta | Global | | Final Adj. PDV |
|---|---|---|---|---|---|---|---|---|---|---|
| IPDV | ACA | ACA | ACA | ACA | ACA | ACA | ACA | ACA | AAA | |
|  | MCA | MCA | MCA | MCA | MCA | MCA | MCA | | | |
| C 100 | −10.0 | −10.0 | −10.0 | −10.0 | −10.0 | −10.0 | −10.0 | −10.0 | −10.0 | 80 |
|  | −1.3 | 0.0 | 0.0 | 0.0 | −2.7 | −6.0 | 0.0 | | | |
| M 70 | −7.00 | −7.00 | −7.00 | −7.00 | −7.00 | −7.00 | −7.00 | −7.00 | −7.0 | 56 |
|  | −.91 | 0.0 | 0.0 | 0.0 | −1.89 | −4.2 | 0.0 | | | |
| Y 10 | −1.00 | −1.00 | −1.00 | −1.00 | −1.00 | 1.00 | −1.00 | −1.00 | −1.0 | 8 |
|  | −.13 | 0.0 | 0.0 | 0.0 | −.27 | −.60 | 0.0 | | | |

TABLE L-continued

| Pixel Stack | CPK .13 Neutral | CPK 0.0 Red | CPK 0.0 Yellow | CPK 0.0 Green | CPK .27 Cyan | CPK .60 Blue | CPK 0.0 Magenta | Global | | Final Adj. PDV |
|---|---|---|---|---|---|---|---|---|---|---|
| K 0 | 0.00 0.0 | 0.00 0.0 | 0.00 0.0 | 0.00 0.0 | 0.00 0.0 | 0.00 0.0 | 0.00 0.0 | 0.00 | 0.0 | 0 |

Digital image file 12 to be color-transformed may be a continuous tone image such as a bitmap or raster image, or it may be a vector graphic image file or a combination of both. In a vector graphic file, instructions are given to draw an image such as draw a blue line from point A to point B. In such instances, the process described herein is used to color-correct the foreground and background colors and use the color corrected colors to draw the images. Therefore, instead of stepping through the pixel stacks as described above, the process herein steps through the foreground and background color instructions and the vector instructions to correct the colors in the vector instructions.

The method described above enables a component approach of color correction or transformation. It enables color correction for the uniqueness of a color reproduction system's isolated, non-integrated, distinction in tone-reproduction, gray-balance, and hue/saturation characteristics which are affected by a multitude of variable printing conditions. Hue and saturation correction is enabled by transfer curves of the C, M, Y, R, G, B Color Family sets; gray balance correction is enabled by transfer curves of the neutral Color Family set; and tone reproduction correction is enabled by transfer curves of the global set. Using the system and method described above, the color correction coefficients may be applied to digitized image files accurately and efficiently without requiring the services of highly skilled operators. The component approach is more flexible and accommodating than the integrative approach for changing printing conditions. For example, the component approach would adapt to different paper stocks that exhibit variable light scattering effect characteristics, paper color differences, proofs manufactured out of perfect tone-reproduction specifications, last-minute subjective personal preference changes, and ambient climate changes around the printing device. The present system and method is primarily designed to be applied to the task of inter-device color control, and may be adapted to be applied to the tasks of editing digitized color images, and digitizing color images. The color transformation described herein are performed in direct proportion to the degree of kinship or affiliation with the Color Families. Therefore, a color that is affiliated with only one Color Family is corrected only by that Color Family's color correction coefficient absolute adjustment value to the fullest extent since its CPK to that color is 100%. A color that is affiliated with two Color Families is color corrected by the coefficient adjustment values of those two Color Families in direct proportion to the degree of kinship to each Color Family. Finally, a color that is affiliated with three Color Families is color corrected by the coefficient adjustment values of those three Color Families in direct proportion to the degree of kinship to each Color Family. A color cannot be affiliated with more than three Color Families.

What is claimed is:

1. A method for execution in a computer, comprising:
   receiving, as input to the computer, a set of multi-channel transfer curves for each defined region of a color model of conceptual colors of a multi-channel image;
   receiving, as input to the computer, a digital image file having a plurality of pixel stacks;
   for each pixel stack in the digital image file:
      identifying initial percent dot values for the pixel stack;
      for each defined region of said color model:
         determining a degree of affiliation between the defined region and the initial percent dot values mapped to a locus on an aberrated hypercube color model;
         determining an absolute adjustment value prescribed for the defined region's transfer curve for each initial percent dot value; and
         modifying the absolute adjustment value in response to the degree of affiliation of the defined region;
      determining an assimilated/accumulated curve adjustment value by summing the modified absolute curve adjustment values of the transfer curves for each defined region;
      applying the assimilated/accumulated curve adjustment value to the initial percent dot value to generate a color-corrected percent dot value; and
      replacing the initial percent dot value in the digital image file with the color-corrected percent dot value.

2. The method of claim 1, wherein receiving a set of transfer curves comprises receiving seven color correction coefficient adjustment values and one global color correction coefficient adjustment value.

3. The method of claim 2, wherein receiving seven correction coefficient adjustment values comprises receiving at least one color correction coefficient adjustment value for each of seven conceptual color families: neutral, cyan, magenta, yellow, red, green, and blue.

4. The method of claim 1, wherein receiving a digital image file comprises receiving a vector graphics digital image file.

5. The method of claim 1, further comprising converting pixel stack data in the digital image file from an 8-bit code to a percent dot value.

6. The method of claim 1, wherein determining an assimilated/accumulated curve adjustment value comprises interpolating from control set points in the transfer curve closest to the initial percent dot value.

7. The method of claim 1, wherein determining a degree of affiliation comprises determining a non-zero degree of affiliation of the pixel stack to one to three of the seven conceptual color families that total 100%.

8. The method of claim 1, wherein determining a degree of affiliation comprises disregarding a lightness attribute from the determination of degree of affiliation to the conceptual color families.

9. The method of claim 1, wherein determining a degree of affiliation comprises utilizing CMY initial percent dot values for the determination of degree of affiliation to the seven conceptual color families.

10. The method of claim 1, wherein determining a degree of affiliation comprises determining a non-zero degree of affiliation to one to three of the seven conceptual color families.

11. The method of claim 1, further comprising using the method for inter-device color control.

12. The method of claim 1, further comprising using the method for digitizing color images.

13. The method of claim 1, further comprising using the method for editing digitized color images.

14. The method of claim 1, further comprising simultaneously applying the assimilated/accumulated curve adjustment values for all defined regions.

15. A method for execution in a computer, comprising:
receiving, as input to the computer, at least one color correction coefficient adjustment value for each of seven conceptual color families and at least one global color correction coefficient adjustment value;
receiving, as input to the computer, a digital image file having a plurality of pixel stacks, each pixel stack having four initial percent dot values for cyan, magenta, yellow, and black, respectively;
for each pixel stack in the digital image file:
determining a degree of affiliation of the pixel stack to each of seven conceptual color families including neutral, cyan, magenta, yellow, red, green, and blue;
determining an absolute curve adjustment value for each color family and the global color correction coefficient adjustment value for each initial percent dot value of the pixel stack;
modifying the absolute curve adjustment value in response to the degree of affiliation;
determining an assimilated/accumulated curve adjustment value by combining the modified absolute curve adjustment values for all conceptual color families;
applying the assimilated/accumulated curve adjustment value to the initial percent dot value to generate a color-corrected percent dot value; and
replacing the initial percent dot value in the digital image file with the color-corrected percent dot value.

16. The method of claim 15, wherein receiving a set of transfer curves comprises receiving seven color correction coefficient adjustment values and one global color correction coefficient adjustment value.

17. The method of claim 15, wherein receiving seven correction coefficient adjustment values comprises receiving at least one color correction coefficient adjustment value for each of seven conceptual color families: neutral, cyan, magenta, yellow, red, green, and blue.

18. The method of claim 15, wherein receiving a digital image file comprises receiving a vector graphics digital image file.

19. The method of claim 15, further comprising converting pixel stack data in the digital image file from an 8-bit code to a percent dot value.

20. The method of claim 15, wherein determining an assimilated/accumulated curve adjustment value comprises interpolating from control set points in the transfer curve closest to the initial percent dot value.

21. The method of claim 15, wherein determining a degree of affiliation comprises determining a non-zero degree of affiliation of the pixel stack to one to three of the seven conceptual color families that total 100%.

22. The method of claim 15, wherein determining a degree of affiliation comprises disregarding a lightness attribute from the determination of degree of affiliation to the conceptual color families.

23. The method of claim 15, wherein determining a degree of affiliation comprises utilizing CMY initial percent dot values for the determination of degree of affiliation to the seven conceptual color families.

24. The method of claim 15, wherein determining a degree of affiliation comprises determining a non-zero degree of affiliation to one to three of the seven conceptual color families.

25. The method of claim 15, further comprising using the method for inter-device color control.

26. The method of claim 15, further comprising using the method for digitizing color images.

27. The method of claim 15, further comprising using the method for editing digitized color images.

28. The method of claim 15, further comprising simultaneously applying the assimilated/accumulated curve adjustment values for all defined regions.

29. A computer-readable medium having encoded thereon a computer-executable method to perform color transformation, comprising:
receiving a set of a plurality of multi-channel transfer curves for each defined region of a color model of conceptual colors of a multi-channel image;
receiving a digital image file having at least one color sample;
for each color sample in the digital image file:
identifying initial dot values for the color sample;
for each defined region of the color model:
determining a degree of affiliation between the defined region and the initial percent dot values mapped to a locus on an aberrated hypercube color model;
identifying identify a plurality of initial percent dot values for the color sample;
determining an absolute curve adjustment value for the defined region's transfer curve for each initial percent dot value;
modifying the absolute curve adjustment value in response to the degree of affiliation to the defined region;
combining the modified absolute curve adjustment values, applying the combined absolute curve adjustment to the initial percent dot value, and generating a color-corrected percent dot value; and
replacing the initial percent dot value with the color-corrected percent dot value.

30. The method of claim 29, wherein receiving a set of transfer curves comprises receiving seven color correction coefficient adjustment values and one global color correction coefficient adjustment value.

31. The method of claim 29, wherein receiving seven correction coefficient adjustment values comprises receiving at least one color correction coefficient adjustment value for each of seven conceptual color families: neutral, cyan, magenta, yellow, red, green, and blue.

32. The method of claim 29, wherein receiving a digital image file comprises receiving a vector graphics digital image file.

33. The method of claim 29, further comprising converting pixel stack data in the digital image file from an 8-bit code to a percent dot value.

34. The method of claim 29, wherein determining an assimilated/accumulated curve adjustment value comprises interpolating from control set points in the transfer curve closest to the initial percent dot value.

35. The method of claim 29, wherein determining a degree of affiliation comprises determining a non-zero degree of affiliation of the pixel stack to one to three of the seven conceptual color families that total 100%.

36. The method of claim 29, wherein determining a degree of affiliation comprises disregarding a lightness attribute from the determination of degree of affiliation to the conceptual color families.

37. The method of claim 29, wherein determining a degree of affiliation comprises utilizing CMY initial percent dot values for the determination of degree of affiliation to the seven conceptual color families.

38. The method of claim 29, wherein determining a degree of affiliation comprises determining a non-zero degree of affiliation to one to three of the seven conceptual color families.

39. The method of claim 29, further comprising using the method for inter-device color control.

40. The method of claim 29, further comprising using the method for digitizing color images.

41. The method of claim 29, further comprising using the method for editing digitized color images.

42. The method of claim 29, further comprising simultaneously applying the assimilated/accumulated curve adjustment values for all defined regions.

43. A system comprising:
means for receiving a set of multi-channel transfer curves for each defined region of a color model of conceptual colors of a multi-channel image;
means for receiving a digital image file having a plurality of pixel stacks;
means for identifying initial percent dot values for each pixel stack;
means for determining a degree of affiliation between each the defined region and the initial percent dot values mapped to a locus on an aberrated hypercube color model;
means for determining an absolute adjustment value prescribed for each the defined region's transfer curve for each initial percent dot value; and
means for modifying the absolute adjustment value in response to the degree of affiliation of each defined region;
means for determining an assimilated/accumulated curve adjustment value by summing the modified absolute curve adjustment values of the transfer curves for each defined region;
means for applying the assimilated/accumulated curve adjustment value to the initial percent dot value to generate a color-corrected percent dot value; and
means for replacing the initial percent dot value in the digital image file with the color-corrected percent dot value.

44. The system of claim 43, wherein receiving a set of transfer curves comprises receiving seven color correction coefficient adjustment values and one global color correction coefficient adjustment value.

45. The system of claim 43, wherein receiving seven correction coefficient adjustment values comprises receiving at least one color correction coefficient adjustment value for each of seven conceptual color families: neutral, cyan, magenta, yellow, red, green, and blue.

46. The system of claim 43, wherein receiving a digital image file comprises receiving a vector graphics digital image file.

47. The system of claim 43, further comprising means for converting pixel stack data in the digital image file from an 8-bit code to a percent dot value.

48. The system of claim 43, wherein determining an assimilated/accumulated curve adjustment value comprises interpolating from control set points in the transfer curve closest to the initial percent dot value.

49. The system of claim 43, wherein determining a degree of affiliation comprises determining a non-zero degree of affiliation of the pixel stack to one to three of the seven conceptual color families that total 100%.

50. The system of claim 43, wherein determining a degree of affiliation comprises disregarding a lightness attribute from the determination of degree of affiliation to the conceptual color families.

51. The system of claim 43, wherein determining a degree of affiliation comprises utilizing CMY initial percent dot values for the determination of degree of affiliation to the seven conceptual color families.

52. The system of claim 43, wherein determining a degree of affiliation comprises determining a non-zero degree of affiliation to one to three of the seven conceptual color families.

53. The system of claim 43, further comprising means for preforming inter-device color control.

54. The system of claim 43, further comprising means for digitizing color images.

55. The system of claim 43, further comprising means for editing digitized color images.

56. The system of claim 43, further comprising means for simultaneously applying the assimilated/accumulated curve adjustment values for all defined regions.

* * * * *